United States Patent [19]
Stone et al.

[11] Patent Number: 5,021,978
[45] Date of Patent: Jun. 4, 1991

[54] APPARATUS AND METHOD FOR CONTROLLING FILM DENSITY FOR AN APPARATUS FOR EXPOSING PHOTOGRAPHIC FILM WITH IMAGE DATA

[75] Inventors: Barry N. Stone, Hartland; Richard C. Rice, Oconomowoc; John E. Lorbiecki, Hubertus; Stanley Bernstein, Milwaukee, all of Wis.

[73] Assignee: Camtronics, Ltd., Wukesha, Wis.

[21] Appl. No.: 341,726

[22] Filed: Apr. 21, 1989

[51] Int. Cl.$^5$ .......................... G03B 27/80; G01J 3/50
[52] U.S. Cl. .............. 364/525; 364/571.01; 356/404; 356/443; 382/41
[58] Field of Search .............. 364/525, 571.01, 571.05; 356/404, 408, 443, 379; 382/41

[56] References Cited

U.S. PATENT DOCUMENTS

| | | | |
|---|---|---|---|
| 4,646,252 | 2/1987 | Terashita | 364/525 |
| 4,666,307 | 5/1987 | Matsumoto et al. | 364/525 |
| 4,809,198 | 2/1989 | Terashita | 364/525 |
| 4,855,940 | 8/1989 | Richardson et al. | 364/525 |
| 4,884,221 | 11/1989 | Sugiyama et al. | 364/525 |

Primary Examiner—Parshotam S. Lall
Assistant Examiner—Brian M. Mattson

[57] ABSTRACT

A predetermined gradation of film transmittance levels, e.g. a gray scale, provided by a film exposure system is calibrated so as to consistently create an image on photographic film in accordance with the predetermined gradation of film transmittance levels. A light source is responsive to a drive signal, for generating light so that the exposure of different portions of the film to the light can be varied as a function of the drive signal so as to vary the resulting transmittance level of the portions of the film after the exposed portions of film are developed in order that the image can be formed on the film, and a sensing device senses the transmittance level of a developed portion of film exposed to at least one preselected value of light exposure and generates a transmittance level signal representative of the sensed transmittance level. The drive signal is adjusted as a function of the sensed transmittance level so that the range of transmittance levels produced by exposing the film to the light in response to the adjusted drive signal approximates the predetermined gradation of film transmittance levels.

16 Claims, 3 Drawing Sheets

APPARATUS AND METHOD FOR CONTROLLING FILM DENSITY FOR AN APPARATUS FOR EXPOSING PHOTOGRAPHIC FILM WITH IMAGE DATA

BACKGROUND OF THE INVENTION

1. Related Applications

The present application is related in subject matter to the following U.S. patent applications filed simultaneously herewith of: Ser. No. 341,730 filed in the names of Richard C. Rice, Barry N. Stone and Lynn J. Orendorff and entitled SYSTEM AND METHOD FOR CONTROLLING EXPOSURE FORMAT FOR AN APPARATUS FOR EXPOSING PHOTOGRAPHIC FILM WITH IMAGE DATA; and Ser. No. 341,731 filed in the names of Richard C. Rice entitled CALIBRATION APPARATUS FOR A LIGHT SOURCE USED FOR EXPOSING PHOTOGRAPHIC FILM WITH IMAGE DATA.

1. Field of the Invention

The present invention generally relates to apparatuses for exposing photographic film with image data and, in particular, to control of the exposed film density produced by such apparatuses.

2. Statement of the Prior Art

Photographic film has become the accepted archival medium for medical imaging because of its high analog resolution and because of its long time use with x-rays. Conversely, modern medical imaging techniques, such as computerized tomography, digital radiographic imaging, ultrasound and magnetic resonance imaging, have developed around the use of digital imaging techniques where an image is made up of a great many pixels each of which has an electronically represented brightness. In order to adapt these new techniques to the accepted archival medium, apparatuses have been developed for creating a hard copy by "printing" the electronic image data onto photographic film. These apparatuses are generally referred to as hard-copy cameras.

Thus far, the two primary approaches have used lasers and cathode ray tubes as light sources to expose the film by illuminating each pixel to the proper intensity. These devices have experienced some problems in controlling the exposure or writing intensity and the resulting film density due to several inherently unstable factors. Exposure intensity is generally affected by the light producing response of the light source, and film density is affected by the exposure intensity, of course, and also by the response of the film and the developing chemicals.

One attempt at controlling the various factors involved is described in U.S. Pat. No. 4,700,058. This patent describes a general scheme for using an exposure intensity calibrated at a predetermined level, for producing a gray scale on a film sample and then measuring the film density against a standard after developing of the film. The measured densities are then used to control an input amplifier, or a look-up table in the digital version, to provide compensation for the response indicated by the measured film densities. The exposure intensity is periodically recalibrated using the same predetermined level to adjust for short term variations in light intensity.

Although this technique takes into account short term intensity variations and film density variations, it does not calibrate the light source in response to film density, and it does not allow for variations of the input data format or compensate for its effect on exposure intensity. Exposure intensity in the prior patent is calibrated to predetermined black and white levels or references located within the instrument. Film density is then measured, and the adjustment data is stored in the data input section by means of either a look-up table or bias and gain settings for an amplifier. Unfortunately, it is possible for the calibrated light intensity levels to differ significantly from the light intensity levels corresponding to the densities at which the film is measured. In other words, the film density may be measured using one set of exposure intensity levels while the exposure intensity is calibrated at a different level. This condition can introduce gray scale inaccuracies due to the nonlinear responses of the light source, the film and the developing chemicals. Further, this prior approach does not allow the instrument to be used with mage data having different formats.

SUMMARY OF THE INVENTION

Accordingly, the present invention provides an apparatus having improved exposure intensity calibration while also allowing compensation for different image data formats.

The present invention provides an apparatus for exposing photographic film with image data comprising a light source for exposing the film; means for measuring exposure light intensity from the light source; means for generating a light transmittance signal responsive to the light transmittance of developed film; and computer control means coupled to the means for measuring, the means for generating, and the light source for controlling the exposure light intensity therefrom, the computer control means having a plurality of instruction means including first instruction means for determining a transmittance signal level representing a standard film density, and for determining a reference exposure intensity for producing the standard film density, and second instruction means for calibrating the intensity of the light source to the determined reference exposure intensity.

In an alternate embodiment, the present invention provides an apparatus for exposing photographic film with image data comprising a light source for exposing the film; means for measuring exposure light intensity from the light source; means for generating a light transmittance signal responsive to the density of developed film; and means for controlling the intensity of the light source for exposing the film including means for determining a transmittance signal level representative of a standard film density for an exposed and developed piece of film and for determining a reference exposure intensity for the light source for producing the standard film density, and means for calibrating the exposure intensity of the light source to the determined reference exposure intensity.

The method of the present invention provides the steps of determining both a light transmittance signal level representative of a standard film density for an exposed and developed piece of film and a reference exposure intensity for the light source for producing the standard film density; and calibrating the exposure intensity of the light source to the determined reference exposure intensity.

A BRIEF DESCRIPTION OF THE DRAWINGS

The present invention is illustratively described with respect to the accompanying drawings of which:

DETAILED DESCRIPTION OF THE DRAWINGS

Figure 1:
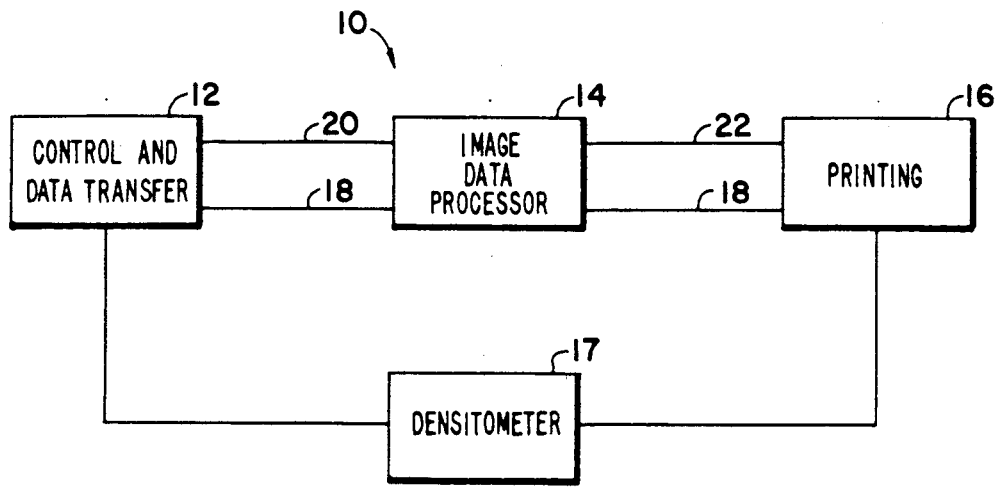
FIG. 1 is a system block diagram of one embodiment of the present invention.

FIG. 1 generally shows a system for producing hard copy film images from digitized image data. Generally included are a Control and Data Transfer section 12, an Image Data Processor section 14, a printing section 16 and a densitometer 17. The Control and Data section 12 would typically include a computerized control for the entire system 10 along with means for inputting, transferring and causing the printing of image data. The Image Data Processor section 14 would typically include a frame memory for storing as image to be printed and some form of processor for handling the data and converting it into proper form for printing. The Image Data Processor section 14 is coupled to the control section 12 by means of a data bus 18 and an address bus 20 along with other known control lines, not shown. Printing section 16 would include the actual printing mechanism including a source of light, an optical mechanism and the film to be exposed. Also included would be the position and intensity controls for the light source. Printing section 16 is coupled to receive image data from the Image Data Processor section 14 via a separate data bus 22. Densitometer 17 includes means for generating a signal, responsive to the density or light transmittance of developed film previously processed in printing section 16.

Figure 2:
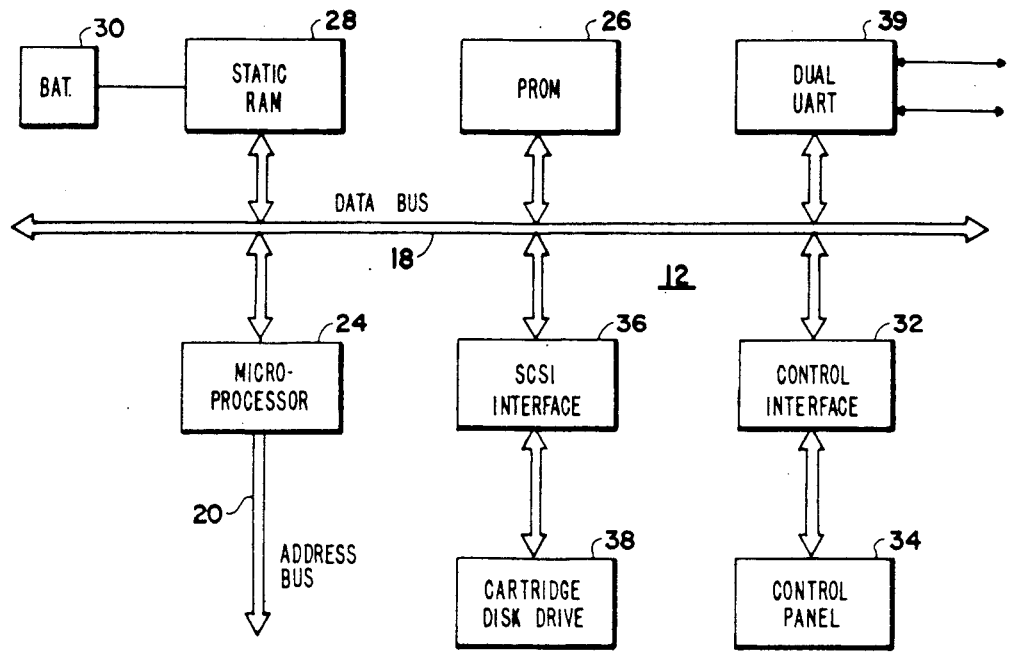
FIG. 2 is a block diagram of a portion of the system of FIG. 1.

FIG. 2 shows greater detail for the Control and Data Transfer section 12. This section is constructed in the manner of a common microprocessor controlled computer and even uses a common Intel 80186 as the microprocessor 24. Microprocessor 24 is coupled to other modules in the system via the data bus 18 and the address bus 20. A programmable read only memory (PROM) 26 stores programmed instructions for the microprocessor 24. A static random access memory (SRAM) 28, along with a battery backup 30, are used for the long term storage of data which varies during the system operation. A control interface 32 and control panel 34 allow for operator interface with the microprocessor 24, and a SCSI interface 36 provides communication with the cartridge disc drive 38 to allow the inputting of image data into the entire processing system any suitable drive 38 may be used which has removable disks to allow the transfer of image data from various imaging apparatuses to the present system. Lastly, a dual UART (universal asynchronous receiver transmitter) 39 provides two channels of serial communication for the microprocessor 24.

Figure 3:
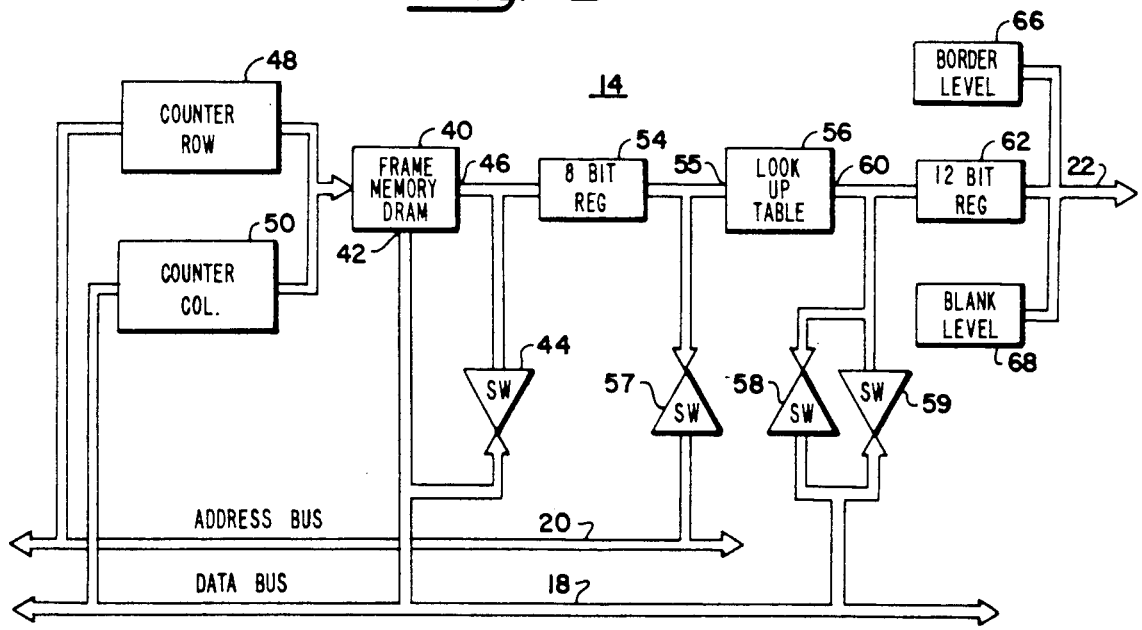
FIG. 3 Is a block diagram of another portIon of the system of FIG. 1.

FIG. 3 shows greater detail for the Image Data Processor 14. As mentioned, a frame memory 40 is included which is coupled to the data bus 18 at both its input 42 and its output 46 via a switch 44. This allows the inputting of data and the retrieval of data through the data bus 18 for the purpose of testing the memory 40. The frame memory 40 is addressed by a pair of counters 48 and 50 which are controlled by the address bus 20 and data bus 18, respectively. Counters 48 and 50 are both 10 bit counters for addressing the rows and columns of memory 40, respectively, and are coupled thereto via a bus 52. Thus, in this embodiment the memory 40 has a capacity of approximately one megabite by 8 bits for storing an image as large as 1,024 by 1,024 pixels.

Image data is transferred from memory 40 in a pipelined manner. The output 46 of memory 40 is coupled to an 8 bit register 54 for latching image data from memory 40 one pixel at a time. Image data is coupled from register 54 to the addressing input 55 of a look-up table 56.

Look-up table 56 and 256 addresses for the 8 bits of input data and 12 bits of intensity data at each of the 256 addresses. This enables expansion of the intensity data from 8 to 12 bits and allows various weighting to be applied to different ranges of the intensity data. This provides implementation of gamma correction, a well known technique which is typically implemented in analog form. This digital implementation is inherently more adjustable and stable. The look-up table 56 may be addressed from the microprocessor 24 via the address bus 20 and a switch 57, while data may be transferred to and from the table 56 via the data bus 18 and switches 58 and 59.

The data output 60 of look-up table 56 is coupled to a 12 bit register 62 to allow transfer of the data from the table 56. The 12 bit output bus 22 is coupled to the register 62, a border intensity level memory 66 and a blanking intensity level memory 68. By these means, the entire spectrum of image data for each image may be transferred to the Printing section 16 for exposure onto photographic film.

Figure 4:
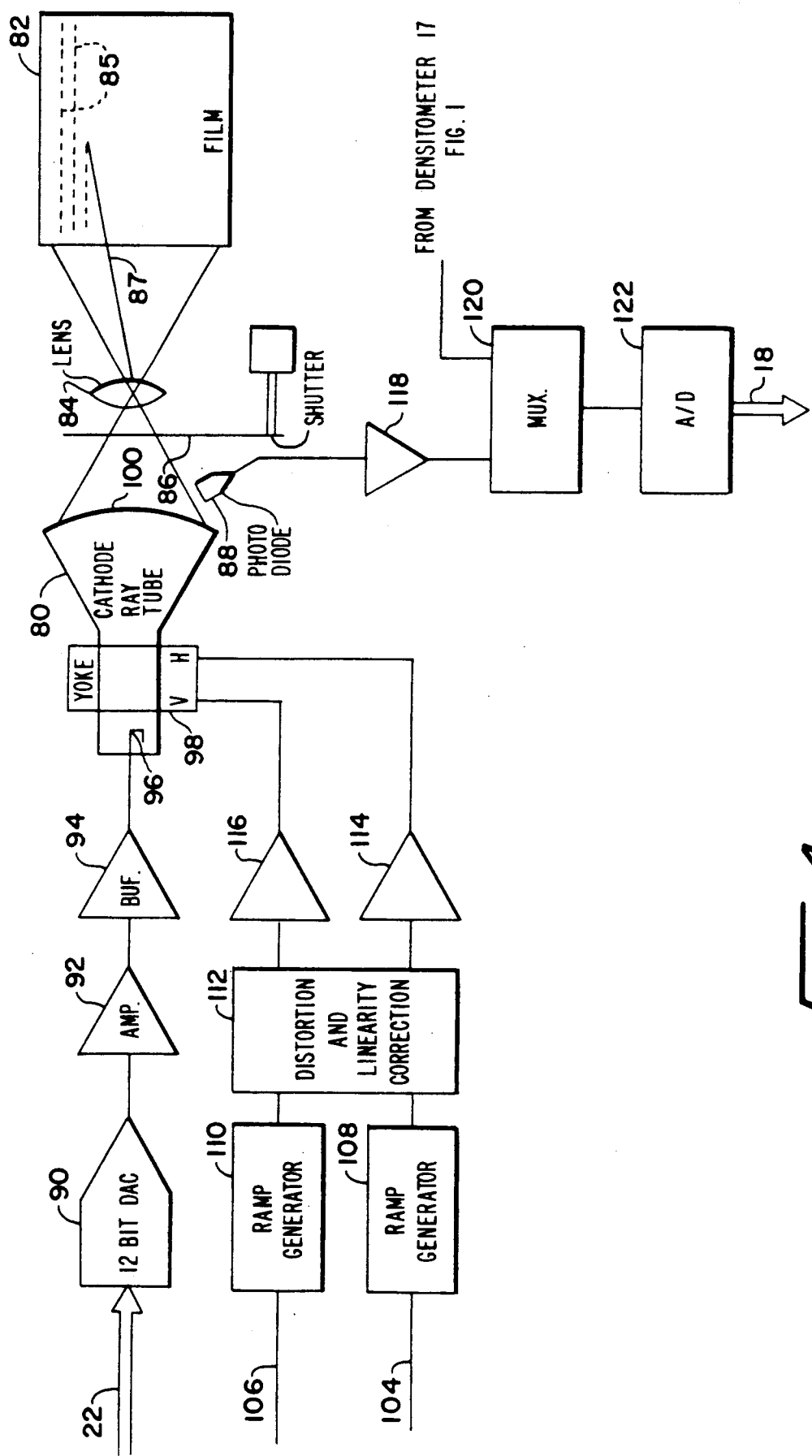
FIG. 4 is a more detailed drawing of a portion of the embodiment of FIG. 1.

FIG. 4 shows further detail of the Printing section 16 which actually exposes the photographic film in accordance with the image data delivered from the Image Data Processor 14. FIG. 4 representationally shows the cathode ray tube (CRT) 80 which acts as a light source for exposing the film 82 along with an optical lens 84 and a shutter mechanism and motor 86. CRT 80 produces a beam of light 87 which is scanned over the film 82 to expose each pixel of an image. Film 82 is shown to be turned ninety degrees out from CRT 80 solely for demonstrating a scanning pattern.

Further included in the exposure apparatus is a photo diode 88 which is used to measure the exposure intensity produced by the CRT 80 for the purpose of ultimately controlling the photo density of the exposed film 82. Photodiode 88 is set back somewhat from the surface 100 of CRT 80 in order to receive light from more than just a small area of the surface. This is done to average the light of an area of the surface to prevent adverse effects from any spot irregularities.

The image data is received from the 12 bit output data bus 22 of FIG. 3 by a 12 bit digital to analog converter (DAC) 90. The output of DAC 90 is an analog signal proportional to the intensity information contained in the digital image data. This analog signal is amplified by video amplifier 92 and coupled through a buffer 94 to the cathode 96 of CRT 80. In this manner, the digital image data is used to control the intensity of each pixel produced by the electron beam of CRT 80.

CRT 80 further includes a horizontal and vertical deflection yoke 98 which controls the point at which the electron beam of CRT 80 impacts the front surface 100 thereof and correspondingly where the light beam 87 strikes the film 82. The control yoke 98 is coupled to and controlled by horizontal and vertical deflection control circuitry 102. Circuitry 102 receives horizontal and vertical synchronization (sync) signals 104, 106, respectively, from the microprocessor 24. The sync signals control ramp generators 108 and 110. These ramp generators are the primary position determining components for the electron beam of CRT 80. The ramp signals produced by generators 108 and 110 are coupled through a distortion and linearity correction circuit 112 which corrects for image nonlinearity and the pin cushion effect caused at corners of the image. The resulting corrected horizontal and vertical drive signals are coupled through amplifiers 114 and 116, respectively, to the coils of yoke 98.

Photo diode 88 is connected through an amplifier 118 to a multiplexer 120. The other input of the multiplexer is connected to receive the output of densitometer 17, as described hereinafter. In this manner, photo diode 88 and the output of densitometer 17 are coupled to an analog to digital converter (A/D) 122 which produces digital signals for coupling through the data bus 18 to microprocessor 24. Converter 122 is of the type which either averages or integrates the input signal over a predetermined period of time. One such converter which performs this function is a dual-slope converter. The period of time is typically one line cycle of the power supply (i.e. 60 Hz.). This causes the averaging out of any supply based interference.

Figure 5:
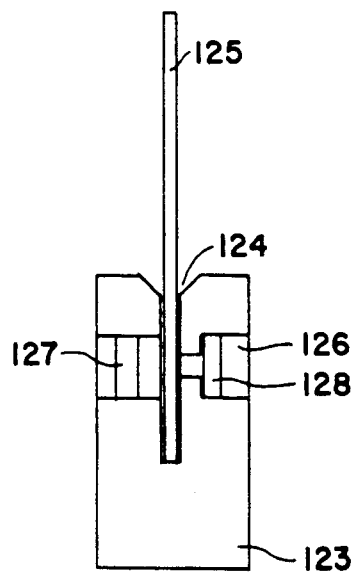
FIG. 5 is a side view of a portion of the embodiment of FIG. 1.

FIG. 5 shows a side view of greater detail of the densitometer 17 of FIG. 1. Although referred to as a densitometer, the member 17 is not required to measure density against any standard. The densitometer required for the present embodiment merely needs to be sufficient to generate an electrical signal which is responsive to and a function of the relative density or transmittance of different portions of developed film, i.e. as the density or transmittance values of different portions of the developed film related to one another. For this purpose, a member 123 is shown which has a centrally located slot 124 for receiving a piece of developed film 125. Member 123 also includes a channel 126 which intersects slot 124 and is located generally orthogonally with respect thereto. Affixed within channel 126 and on separate sides of slot 124 are a light emitting diode LED 127 and a photodiode 128 so that LED 127 provides a beam of light toward the photodiode along an axis normal to the film plane. The LED 127 is powered by a regulated power supply, not shown, to provide a light source having short term stability sufficient for the measurement period of the present embodiment.

A stepper motor, not shown, is used to move the member 123 orthogonally with respect to the plane of the drawing and along a portion of the film 125 so that the beam from LED 127 traces the path through a predetermined portion of the developed film. The stepper motor is controlled via appropriate drive circuitry by the microprocessor 24.

THEORY OF OPERATION

As mentioned, the entire apparatus is controlled by microprocessor 24 in accordance with program instructions stored in PROM 26. These program instructions are set forth generally in Table 1 which is described in greater detail below.

In general, the first step of the printing process generally includes a film transmittance test upon which calibration of the exposure or writing intensity is based. The transmittance test determines relative standard black and white film densities or transmittance in accordance with industry standards, as a factor of the base plus fog transmittance of the actual film being used. This allows monitoring of the developing process to compensate for variations in film response and chemical usage and age. The transmittance test is typically performed at the beginning of each day and at the start of each new package of film. It may also be performed at any time at the option of the operator. Thus, any suspect condItIons may he tested for and compensated for throughout the printing process.

The transmittance test is performed by exposing a piece of film with a pair of gray scales centered around approximated standard black and white exposure intensity levels. Also included is a substantially clear portion of the film. The writing intensity of each gray scale step is known. These intensities may be factory set or stored in the statIc RAM 28 from a previously run transmittance test.

After the film is developed, it is placed in the densitometer 17. A transmittance signal is generated by the densitometer responsive to the relative densities or transmittance of the gray scale steps, including the clear portion. The microprocessor 24 then takes the signal level representing the clear portion and calculates transmittance signal levels representing relative standard black and white film densities based upon the clear film portion. Based upon the calculated standard transmittance signal levels, the transmittance signal for the gray scale steps and the known exposure intensities used to produce the gray scale steps, it is possible for microprocessor 24 to determine the exposure intensities that are necessary to produce each of the standard densities. These intensities are referred to as the standard black and white exposure intensities. They may be determined by any suitable method.

Each standard exposure intensity may be interpolated from the two exposure intensities corresponding to the transmittance signal level measured on either side of the calculated standard transmittance signal level. It may alternatively be desirable to perform a second exposure procedure in order to more accurately determine the standard exposure intensities. This would be done using a smaller overall range of exposure intensities around each of the values determined from the first exposure procedure. The range may even be defined by using the measured film transmittances and their respective exposure intensities, which bracket each of the calculated standard transmittance signal levels, as the minimum and maximum levels for the second set of gray scales which are exposed on a second piece of film. The results developed from the second exposure may then be used to interpolate more accurate exposure intensities for the calculated standard black and white film densities. Using the second exposure process eliminates nonlinearities which would degrade the accuracy of interpolation after the first exposure process.

it is also possible to base the first exposure process on a narrower range of exposure intensities. However, this may require repetition of the exposure if the calculated standard transmittance signal levels are outside of either or both of the gray scale transmittance signal ranges produced.

Once again, the end result of the film transmittance test is the determination of standard exposure intensity levels which may be measured by photodiode 88 so that the intensity output of CRT 80 may be accurately calibrated.

Once the standard exposure intensities for black and white are determined, the apparatus is ready for use in the printing process. The operator typically inserts a disk cartridge into the disk drive 38, which disk cartridge includes image data to be printed. The image data may be recorded on the disk by any suitable means. Imaging apparatuses may be adapted to record the image data onto disks.

The image data may have any one of a wide variety of formats of horizontal lines of image pixels. That is, the images may have any given number of lines and any given number of pixels per line. The particular format of the image data is noted in a header block on the cartridge disk so that microprocessor 24 may read the header block and determine how many images are on the disk, what the format of those images is and where those images are located on the disk. The disk may also be used to carry gamma correction information from the particular instrument which produced the images. Because of the flexibility of the formatting of the images, this system may accept disks from a variety of different types of imaging instruments. Such different instruments may require different gamma correction schemes for either linearizing or enhancing various ranges of intensity.

Once the microprocessor 24 has determined the format of the stored image data it can then calculate the exposure format which it will use to reproduce the image on film. This initial format determination is made simply with respect to the number of horizontal lines located in the vertical direction on the image. This is done for purposes of calibrating the CRT intensity levels through the setting of the intensity values of look-up table 56. The formatting of the number of pixels per line does not affect exposure intensity and thus is not determined at this point.

The present embodiment prints each horizontal line of image data as a plurality of overlapping exposure lines 85 each of which is separately produced by the light beam 87. The number of successive exposure lines and the spacing of all of the exposure lines over the image is varied depending upon the format of the image data on the disk and the desired exposure format or final print size on the film 82. This variability allows the present invention to accept images having different image data formats.

For example, images typically have between 400 and 1000 horizontal lines. For formats having up to approximately 500 lines, the number of successive exposure lines per image line of data would be 4. For 500 to 700 lines, the repetition would he 3, and for 700 to 1000 lines, the repetition would be 2. The amount of overlap between successive lines depends upon the spot size or line width and the spacing of the lines. It is preferred that the spacing be less than the spot size or line width in order to cause overlapping. It should be noted that successive image lines are allowed to overlap to remove the appearance of raster lines.

In the actual exposure process, the number and the spacing of the horizontal lines is controlled by the horizontal sync signal on line 104 from microprocessor 24. The vertical ramp generator 110 operates constantly while the horizontal sync signals are controllably delayed to provide a controllable spacing for successive exposure lines. Because the CRT scan rate is arbitrarily set by the present embodiment and is not run at the normal high video presentation rate of 30 frames per second, great flexibility is available for the timing control of the horizontal sync signals.

As mentioned, once microprocessor 24 determines the data format of the image data on the disk cartridge, it determines the repetition rate and line spacing for the actual printing process. Microprocessor 24 then takes this spacing and produces separate black and white test patterns on the CRT 80, which patterns are sensed by the photodiode 88 for intensity level and adjusted until the so measured intensity levels match the standard exposure intensity levels determined from the film transmittance test.

The method of adjustment used may be described as successive approximation. The twelve bits of input data for DAC 90 are controlled by microprocessor 24 which sets the contents of register 62. Each of the twelve bits, which are originally set high, is sequentially switched low proceeding from the most to the lease significant bit. After each switching, the photodiode 88 is tested to see if its output, as measured by A/D 122, is either above or below the stored standard intensity value. If photodiode 88 indicates a low reading, the next sequential bit is switched. If the indication is high, the bit just switched is reset high and then the next sequential bit is switched low. When the process is completed the intensity level measured by photodiode 88 is the same as that stored for the particular standard intensity value being set.

When the CRT output is adjusted to produce the same intensity values as those stored for the standard intensities, the digital signals inputted to DAC 90 for producing each of these signals are then stored in look-up table 56 along with gray scale intermediate data as determined by microprocessor 24. This gray scale data may be linear or nonlinear and may implement a gamma correction function.

The next step in the printing process includes determining the horizontal output rate for the frame memory 40. This horizontal output rate is varied in order to allow image data of whatever size to fit in the desired size for the final printing. The adjustment is made by simply varying the horizontal pixel output rate from frame memory 40. Each pixel on a horizontal line of the image is held at the output 46 of frame memory 40 for a controllable number of system clock pulses, depending upon the determined printing format. Each horizontal pixel may be held at the output for the same amount of time, or the amount of time may be varied between each pixel so that an image data format of a given number of pixels will fit the fixed output image size, or exposure format, using a fixed microprocessor clock rate. For example, horizontal pixels may be alternately outputted for six and seven clock pulses across the entire width of the image in order to cause a proper fit of the given image data format within the fixed exposure format. The same output clock pulsing is repeated for each horizontal line with the result of no noticeable distortion to the printed image.

Once the vertical repetition and overlap rate and the horizontal pixel output rate are determined, an image is transferred to the frame memory 40 and printed. Subsequent images on the same image data dIsk are printed using the same exposure format settings. If images having a different data format are to be printed, the OAC values for look-up table 56 must be reset to produce the standard exposure intensity values for the new format. If the package of film, or any other density sensitive factor, changes, the film transmittance test will be rerun to produce new standard black and white exposure intensities. Also, the DAC values of look-up table 56 will be reset. The above process is controlled by microprocessor 24 in accordance with program instructions stored in pROM 26. These program instructions are represented in the steps set forth in Table 1.

TABLE 1

PROGRAM STEPS

130 Initialization
132 Film transmittance Test
    134 Intensity Calibration
        136 Find black reference intensity spread
        138 Find white reference intensity spread
        140 Calibrate 19 intensities for 1024 ppl + 512 lpf
    142 Expose gray scales
    144 Measure developed film transmittance
    146 Cal. ref. black and white transmittance signal levels
    148 Approx. reference intensities and determine fine range
    150 Determine new intensity readings
    152 Intensity Calibrate fine range
    154 Expose gray scales
    156 Measure fine gray scale transmittance
    158 Interpolate black and white intensity levels
160 Determine image format
162 Determine exposure format
164 Calibrate black and white intensities
    166 Find white dac valve
    168 Find black dac valve
170 Fill in Look-up Table
172 Determine pixel clock rate
174 Image data to memory 40
176 Print image More specifically, when the apparatus is first turned on, the microprocessor 24 goes through a common initialization sequence 130. At this point, all of the system components which may be tested by the microprocessor 24, including itself, can be so tested. Microprocessor 24 is then ready to control the apparatus to perform its intended functions.

After the initialization step 130, the operator typically initiates a film transmittance test 132 which includes several program substeps 134-158. The first general step of a film transmittance test is referred to as the Intensity Calibration step 134 which calibrates the CRT intensity for a gradation or gray scale of intensity levels around each of a pair of approximated standard black and white exposure intensity levels. Step 136 takes the desired approximated intensity reading for the black reference and determines a spread of intensity readings thereabout. Step 138 takes the approximated white intensity reading and determines a spread of white intensities beginning with base plus fog. Step 140 performs the actual calibration process for the CRT intensity for 19 different intensity levels, 10 around the black reference and 9 plus a clear density portion around the white reference, all based upon an exposure format of 1024 pixels per line (ppl) and 512 lines per frame (lpf). The density of the clear portion is commonly referred to as base plus fog. The calibration process is performed by the same successive approximation technique as is described above. It is performed for each of the 19 gray scale steps around the black and white reference values.

Once the 19 exposure intensity levels are calibrated, step 142 exposes a piece of film with a pair of gray scales around each of the black and white standard intensities. This exposure is done as two separate steps, one for each of the black and white gray scale patterns.

Once the film is exposed, the operator removes it from the instrument and passes it through the developing process. After developing, the film is placed in the densitometer 17 and step 144 measures the relative density or transmittance between each of the 19 gray scale portions in addition to the base plus fog area. This is accomplished by generating a transmittance signal which is responsive to the various densities on the film. The stepper motor is used to move the member 123 past each of the gray scale steps while the transmittance signal is read from photodiode 128 and converted to a digital value by A/D 122.

With the base plus fog transmittance signal level, program step 146 can then calculate the transmittance signal levels corresponding to standard black and white densities which have been standardized by the industry as a percentage of the base plus fog reading for the film. Once the black and white transmittance signal level calculations are made, a comparison is made by step 148 against the 19 gray scale relative transmittance measurements to determine which two transmittance signal levels bracket each of the calculated standard transmittance signal levels.

At this point, it is possible to either interpolate the necessary exposure intensity levels for producing the calculated transmittance or to perform another exposure step to further refine the measurement. Because the exposure process is nonlinear, it is preferable to perform another gray scale exposure process to get closer to the actual transmittance readings and thereby minimize inaccuracies from a linear interpolation process. For this purpose, step 150 approximates the reference intensities and determines a new set of intensity readings for gray scales located around the approximated intensities. Step 152 then calibrates this fine range of intensity values as in step 134. The operator then inserts another piece of film, and step 154 again exposes a pair of gray scales intended to narrowly bracket the calculated black and white transmittance signal levels. After this piece of film is developed, it is inserted into the densitometer 17 which is controlled by step 156 to measure the fine gray scale transmittance values. The microprocessor 24 again has available to it, calibrated and measured intensity levels which produced measured film transmittance signal levels. It uses the measured levels in comparison with the calculated black and white film transmittance signal levels of step 146 to determine the intensity levels at which it should calibrate CRT 80 to produce the calculated standard black and white transmittance levels. Step 158 thereby interpolates the black and white intensity levels based upon the calculated black and white film transmittance signal levels to determine the standard black and white exposure intensities.

Once the film transmittance and the standard exposure intensities have been determined, the software examines the image format information and calibrates the exposure intensity. For this purpose, step !60 causes the mIcroprocessor 24 to look at the cartridge disk drive and to determine the format of the images stored thereon. This is done solely with respect to the number of lines per frame. Step 162 then determines the exposure format, the number of successive exposure lines per image line and the spacing thereof. With the vertical exposure format determined, step 164 can then proceed with calibrating the black and white intensity levels.

Step 166 causes a test pattern to be generated on CRT 80 which is sensed by photodiode 88. The signal therefrom is converted by A/D 122 and fed to microprocessor 24 where it is compared against the stored white, reference exposure intensity reading. During this comparison, the most through least significant bits of register 62 are successively approximated until the converted reading from photodiode 88 matches the white reference exposure intensity. Step 168 likewise repeats this process in comparison with the black reference exposure intensity.

Step 170 takes the twelve bit DAC values determined to produce the reference exposure intensities and loads them into look-up table 56 as the black and white DAC values. Microprocessor 24 then calculates or otherwise determines intermediate DAC values and likewise loads them into table 56.

Step 172 again checks the image data format and determines the horizontal pixel output rate for frame memory 40. Step 174 then loads a frame of image data from the disk into frame memory 40. Lastly, step 174 causes the image data to be appropriately clocked out of memory 40 to DAC 90 while the horizontal and vertical sync signals 104, 106 control the location of the CRT beam and the image is printed.

The above embodiments are intended to be taken in an illustrative and not a limiting sense. Various modifications and changes may be made to these embodiments by persons skilled in the art without departing from the present invention as defined in the appended claims. Such modifications may include the use of analog instead of digitized image data.

CONCLUSION

Thus, an apparatus and method are provided for calibrating the light source of a hard copy camera at the standard densities of the film currently in use. Calibration is provided in the exposure format to be used for the specific image data while allowing variation of the image data format as well as the exposure format. Calibration is provided without the need for measuring actual density and without the need for a reference source having long term stability. The system only requires short term stability for providing accurate measurements. For these reasons, calibration is more accurate with fewer non-linearity errors and circuit complexity and cost are reduced. Further, this approach can be used with a wide variety of imaging instruments due to the format flexibility. In one form, the integration of the calibration process into the computer control mechanism makes calibration more reliable, more readily available and less inconvenient to the operation of the apparatus.

What is claimed is:

1. An apparatus for consistently creating an image on photographic film in accordance with a predetermined gradation of film transmittance levels, said apparatus comprising:
    (a) light source means, responsive to a drive signal, for generating light so that the exposure of different portions of the film to the light can be varied as a function of the drive signal so as to vary the resulting transmittance level of the portions of the film after the exposed portions of film are developed in order that the image can be formed on the film;
    (b) sensing means for sensing the transmittance level of a developed portion of film exposed to at least one preselected value of light exposure and for generating a transmittance level signal representative of the sensed transmittance level; and
    (c) means for adjusting the drive signal as a function of the sensed transmittance level so that the range of transmittance levels produced by exposing the film to the light in response to the adjusted drive signal approximates the predetermined gradation of film transmittance levels.

2. Apparatus according to claim 1, wherein said sensing means includes means for sensing the transmittance level of at least two developed portions of said film correspondingly exposed to at least two different preselected values of light exposure, and for generating corresponding transmittance level signals respectively representative of the two sensed transmittance levels, and said drive signal adjustment means adjusts said drive signal as a function of said two sensed transmittance level signals so that the range of transmittance levels produced by exposing the film to the light in response to the adjusted drive signal predetermined gradation of film transmittance levels.

3. Apparatus according to claim 2, wherein said means for adjusting the drive signal adjusts the signal level of the drive signal for each film transmittance level of the predetermined gradation as a function of said two transmittance signals.

4. Apparatus according to claim 3, further including first storage means for storing relative values of transmittance levels of the predetermined gradation, and second storage means for storing each of the adjusted drive signals corresponding to each of the film transmittance levels of the predetermined gradation, wherein said light source generates light in response to the correct drive signal provided by said second storage means in response to the selection of the value of the corresponding transmittance level in said first storage means.

5. Apparatus according to claim 1, wherein said sensing means includes means for sensing the transmittance level of each of a plurality of developed portions of said film correspondingly exposed to a relatively narrow gradation of values of light exposure around said preselected value and for generating transmittance level signals respectively representative of the transmittance levels of said developed portions, said apparatus further including means for interpolating the corresponding transmittance level provided by said preselected value of light exposure between the two of said transmittance levels of said developed portions that bracket said corresponding transmittance level provided by said preselected value such that the means for adjusting said drive signal adjusts said drive signal based upon the interpolated corresponding transmittance level so that any subsequent exposure of said film to the light as a function of said adjusted drive signal approximates the respective values of light exposure.

6. Apparatus according to claim 1, wherein said sensing means includes means for sensing the transmittance level of each of a plurality of developed portions of said film correspondingly exposed to a relatively narrow gradation of values of light exposure around each of two different preselected values of light exposure and for generating transmittance level signals respectively representative of the transmittance levels of said developed portion, said apparatus further including means for interpolating the corresponding transmittance level provided by each of said preselected values of light exposure between two of said transmittance levels of the corresponding narrow gradation of values that bracket the corresponding transmittance level provided by the preselected values, such that the means for adjusting said drive signal adjusts said drive signal based upon the interpolated corresponding transmittance levels so that any subsequent exposure of said film to the light as a function of each of said adjusted drive signals approximates the respective values of light exposure.

7. Apparatus according to claim 6, wherein said two preselected values of light exposure provided are respectively black and white transmittance levels, and are the developed portion of said film.

8. Apparatus according to claim 7, wherein said narrow gradation of values of light exposure are each gray scale patterns respectively around black and white transmittance levels.

9. Apparatus according to claim 6, wherein each of said transmittance levels is adjusted for base plus fog levels of said film.

10. Apparatus according to claim 9, wherein said sensing means includes means for sensing the transmittance level of a clear portion of said film to establish the base plus fog levels.

11. Apparatus according to claim 1, wherein said transmittance levels are each adjusted for base plus fog levels of said film.

12. Apparatus according to claim 1, wherein said light source means includes means for generating said light as a scanning beam for scanning said film.

13. Apparatus according to claim 12, wherein said light source means includes a cathode ray tube.

14. Apparatus according to claim 12, wherein said light source means includes a laser.

15. Apparatus according to claim 1, wherein said sensing means includes a densitometer.

16. A method of continuously creating an image on photographic film in accordance with a predetermined gradation of film transmittance levels, said method comprising the steps of:
(a) exposing a predetermined portion of film exposed to at least one preselected value of light exposure and developing said portion of film;
(b) generating light so that the exposure of different portions of the film to the light can be varied as a function of a drive signal so as to vary the resulting transmittance level of the portions of the film after the exposed portions of film are developed in order that the image can be formed on the film;
(c) sensing the transmittance level of a developed portion of film and generating a transmittance level signal representative of the sensed transmittance level; and
(d) adjusting the drive signal as a function of the second transmittance level so that the range of transmittance levels produced by exposing the film to the light in response to the adjusted drive signal approximates the predetermined gradation of film transmittance levels.

* * * * *

UNITED STATES PATENT AND TRADEMARK OFFICE
CERTIFICATE OF CORRECTION

PATENT NO. : 5,021,978

DATED : June 4, 1991

INVENTOR(S) : Barry N. Stone, et al

It is certified that error appears in the above-identified patent and that said Letters Patent is hereby corrected as shown below:

Claim 4, column 12, line 29, after "storing" insert -- the --;

Claim 16, column 14, line 7, delete "continuously" and insert therefor -- consistently --; and Claim 16, column 14, line 25, delete "second" and insert therefor --sensed --.

Signed and Sealed this

Sixth Day of October, 1992

Attest:

DOUGLAS B. COMER

*Attesting Officer*     *Acting Commissioner of Patents and Trademarks*